Patented Nov. 29, 1932

1,889,383

UNITED STATES PATENT OFFICE

HANS SCHMIDT, OF WUPPERTAL/VOHWINKEL, GERMANY, ASSIGNOR TO WINTHROP CHEMICAL COMPANY, INC., OF NEW YORK, N. Y., A CORPORATION OF NEW YORK

METAL COMPLEX COMPOUND

No Drawing. Application filed June 4, 1931, Serial No. 542,191, and in Germany June 3, 1930.

The present invention relates to new metal complex compounds, more particularly it relates to complex compounds of metals, having an atomic number higher than 21, with aromatic polyhydroxy compounds containing at least two hydroxy groups in ortho-position to each other and at least one acid, saltforming group, which complex compounds contain simultaneously an alkaline-earth metal of the group consisting of calcium, strontium and magnesium and may further contain alkali metals as neutralizing bases, and to a process of preparing the same.

Complex compounds of metals with aromatic ortho-dihydroxy compounds being substituted by acid, saltforming substituents and containing alkali metal or nitrogen bases as neutralizing media are known.

In contradistinction to the known metal complex compounds the new products obtainable in accordance with the present invention simultaneously contain a metal having an atomic number higher than 21 and an alkaline-earth metal of the group consisting of calcium, strontium and magnesium and, owing to this combination, are of great medicinal interest especially in view of the surprising fact that the new complex compounds dissolve in water with neutral reaction and yield often solutions isotonic to blood at a higher concentration than the known complex compounds containing only alkali metals as neutralizing bases, such solutions being suitable for injection purposes in the medicinal practice.

In accordance with the present invention the new metal complex compounds are produced by reacting upon an aromatic polyhydroxy compound, containing at least two hydroxy groups in ortho-position and at least one acid, saltforming group, with an oxide or hydroxide of a metal the atomic number of which is higher than 21, and a hydroxide of calcium, strontium or magnesium in aqueous solution, whereby neutralization is effected by the addition of a further quantity of a hydroxide of the said alkaline-earth metals or of an alkali metal hydroxide or carbonate.

Equivalent to the said process is to be considered such method of working whereby as starting materials the salts of the said aromatic polyhydroxy compounds with alkali metals or with calcium, strontium or magnesium or with both of them are caused to react with the hydroxides of the metals having an atomic number higher than 21 and, if desired or required, with calcium-, strontium- or magnesium-hydroxide in order to incorporate the complex compounds with one of these alkaline-earth metals or with a higher content thereof. In each case a neutral reaction is to be effected by the addition of calcium-, strontium- or magnesium-hydroxide or an alkali metal hydroxide or carbonate when finishing the reaction.

Of course, also the use of a watersoluble salt of the metals having an atomic number higher than 21 and of a calcium-, strontium- or magnesium-salt simultaneously with alkali metal hydroxides or carbonates is equivalent to the use of oxides or hydroxides of the said metals, since in this manner of working the metal hydroxides are produced from the metal salts in statu nascendi on the addition of the alkali metal hydroxides.

From the above it already results that the succession of the different reaction steps is not of decisive importance for my new process, the alkaline-earth metal hydroxide may be first introduced into the solution of the aromatic polyhydroxy compound and then the hydroxide of the metal having an atomic number higher than 21, or vice versa, whereby it is necessary in the former case that the addition of the alkaline-earth metal hydroxide does not cause an alkaline reaction of the mixture. In each case it is essential that the final reaction is made neutral.

As complex forming aromatic polyhydroxy compounds I prefer to use the pyrocatechol disulfonic acid, but also other polyhydroxy benzene acids, for example, the pyrocatechol monosulfonic acid, the pyrogallol disulfonic acid, the pyrocatechol orthocarboxylic acid, gallic acid and the like have proved to be suitable complex forming compounds. Furthermore, also polyhydroxy compounds of the naphthalene series containing at least two hydroxy groups in ortho-position and at least one acid, saltforming group, such as ortho-dihydroxy-naphthalene sulfonic acid have proved operable in the present process.

In the numerous examples mentioned below the production of complex compounds of those metals, having an atomic number higher than 21, has been described in particular, which are of an especially high interest in combination with calcium, strontium and magnesium, that is to say trivalent and pentavalent, antimony, bismuth, copper, lead, tin, iron, zinc, cobalt and thorium. It may be mentioned, however, that in the same manner as described in the examples also water-soluble complex compounds, for example, of manganese, arsenic, chrome, nickel, thallium, titanium, uranium, tungsten and vanadium may be prepared and that also complex compounds with these other metals, having an atomic number higher than 21 and being not specifically described in the examples, are within the scope of the present invention. For the therapeutic use the most important compounds are the complex compounds of antimony, bismuth and copper.

As alkaline-earth metals simultaneously contained in the complex compounds only those are within the scope of the present invention which are of interest for the medicinal use, that is to say calcium, strontium and magnesium.

The composition of the new complex compounds may vary in wide limits and is not restricted to stoichiometric proportions. Moreover, particularly those compounds which do not correspond to simple atomic proportions, display often especially good therapeutic properties. In this connection it may be emphasized that the present invention does not intend to provide metal complex compounds of a clear chemical composition which would be of a more scientific interest, but it intends to provide valuable medicinal media.

In view of the complicated composition of the new products proved by analysis I am not able to give structural formulæ which would be suitable to formulate the products of my present invention in a general and more easily visible manner. However, in order to more clearly indicate what types of compounds are presumably formed by the present process, the following formulæ of a relatively simply composed antimony-, bismuth- and copper-compound, which are in conformity with the properties and analyses of some of the new products, may give an idea of the new products:

(1) An antimony-calcium-pyrocatechin-calcium-disulfonate:

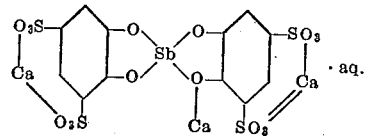

(2) A bismuth-calcium-pyrocatechin-sodium-disulfonate:

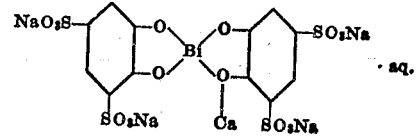

(3) A copper-calcium-pyrocatechin-sodium-calcium-disulfonate:

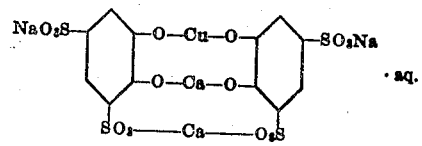

In these compounds one gram atom of the metal of the atomic number higher than 21 is contained on two mols of the complex forming aromatic polyhydroxy compound. However, it may be stated that also compounds containing the metal of the atomic number higher than 21 and the polyhydroxy compound in the proportion of about one gram atom to one mol or to more than 2 mols have been obtained. As the aqueous solutions of the new products are often isotonic to blood at relatively high concentrations, the new complex compounds must possess a high molecular weight. This fact is of great importance for the medicinal use of the new complex compounds.

That the metal having an atomic number higher than 21 in the new products is bound in complex like linkage follows from the fact that these metals are not precipitated from the aqueous solutions of their complex compounds by dilute caustic alkali lyes or dilute mineral acids. However, these metals in general may be established by precipitating them with hydrogen sulfide from the aqueous solutions of the complex compounds. The content of calcium, strontium or magnesium may be proved, for example, by precipitating the same with ammonium oxalate.

The new compounds are white to colored powders, this depending on the metal used for the complex compounds. These compounds decompose on heating without distinctly melting and yield neutral aqueous solutions which are suitable for injection purposes in the medicinal practice.

The invention is illustrated by the following examples without being restricted thereto:—

*Example 1*

To a solution of 18 grams of the calcium salt of pyrocatechol disulfonic acid (obtained from pyrocatechol disulfonic acid and calcium chloride) in 50 ccs. of hot water 8 grams of moist antimony oxide paste are added and with continued boiling an amount of milk of lime sufficient to cause neutral reaction. Boiling is continued for a little while longer, the solution then is filtered from the excess of antimony oxide, the filtrate is concentrated and the antimony-III-calcium-pyrocatechol-calcium-disulfonate formed is precipitated by stirring the solution into methyl alcohol. There is obtained a colorless powder which dissolves readily in water with a neutral reaction. The aqueous solution is not precipitated on adding dilute hydrochloric acid or dilute caustic soda. The solution of the product which is isotonic in respect to tissue displays a considerably higher concentration than that of the corresponding sodium salt thus rendering possible the production of concentrated solutions for injection.

Example 2

The process is carried out as in Example 1 but caustic soda is used for the neutralization. There is obtained an antimony-III-pyrocatechol-calcium-sodium-disulfonate possessing properties similar to those of the product described in Example 1, but with a lower calcium content.

Example 3

To a hot solution of 33 grams of the sodium salt of pyrocatechol disulfonic acid in water 16 grams of moist antimony oxide paste are added and the whole is neutralized with milk of lime while boiling; after then boiling for a short time the solution is filtered from the excess of antimony oxide, the filtrate is concentrated and the antimony-calcium-pyrocatechol-sodium-disulfonate formed is precipitated by stirring the solution into methyl alcohol. There is obtained a powder of similar properties to those described in Examples 1 and 2, but with a lower calcium content.

Example 4

To a hot solution of 36 grams of the calcium salt of pyrocatechol disulfonic acid (obtained as described in Example 1) in 50 ccs. of water bismuth hydroxide paste (freshly prepared from 25 grams of bismuth nitrate) is added. The hydroxide dissolves, the solution is concentrated and the product is precipitated by stirring the solution into methyl alcohol. There is obtained a yellow powder which dissolves readily in water. The aqueous solution is not precipitated on the addition of dilute hydrochloric acid or dilute caustic soda. The solution displays an acid reaction; by the addition of, for example, dilute caustic soda or diethylamine or milk of lime until the neutral point is reached, a neutral solution can be produced.

The neutralization can also be carried out prior to the precipitation in which case a bismuth-calcium-pyrocatechol-calcium-disulfonate is obtained which dissolves in water with a neutral reaction. Solutions isotonic with respect to tissue possess a considerably higher concentration than those of the corresponding sodium salt.

Example 5

To a solution of 18 grams of the calcium salt of pyrocatechol disulfonic acid (obtained as in Example 1) in 50 ccs. of hot water 4.3 grams of cupric chloride are added and then milk of lime until the neutral point is reached; the solution is filtered and the copper-calcium-pyrocatechol-calcium-disulfonate formed is precipitated by stirring the solution into alcohol. After separation and drying a blue colored powder is obtained which dissolves readily in water with a neutral reaction. Dilute caustic soda does not cause precipitation. The calcium content can be established by means of oxalic acid and the copper content by means of hydrogen sulfide.

Example 6

From an aqueous solution of 24.5 grams of copper sulfate copper hydroxide is precipitated by means of excess dilute caustic soda lye. The precipitate is filtered with suction and well washed with water. The precipitate is then made into a paste with a small quantity of water and mixed with 80 grams of calcium pyrocatechol-calcium-sodium-disulfonate (prepared according to U. S. Patent . . . copending application Serial No. 518,913 of February 27, 1931) while stirring. After a short time a clear solution is obtained from which the complex salt formed may be precipitated, for example, by first diluting with methyl alcohol and then pouring into ethyl alcohol. The copper calcium pyrocatechol-calcium-sodium-disulfonate is obtained after separating and drying as a dark green powder, readily soluble in water.

Example 7

A paste of coper hydroxide obtained from 24 grams of copper sulfate as described in Example 6 is mixed with 66 grams of pyrocatechol-sodium-disulfonate. The mixture is neutralized with milk of lime, filtered and poured into ethyl alcohol which has been mixed with methyl alcohol. After separating off and drying the precipitate formed the copper-calcium-pyrocatechol-sodium-disulfonate is obtained as a green powder, readily soluble in water with a neutral reaction. The calcium and copper content may be established in the same manner as described in Example 5.

Copper calcium complex salts may further be produced by reacting upon pyrocatechol-sodium-disulfonate and copper chloride with milk of lime or with calcium chloride and caustic soda lye.

Example 8

24 grams of calcium pyrocatechol-calcium-sodium-disulfonate and 6.3 grams of lead oxide are shaken with 100 ccs. of water. After a short time a solution is obtained which is poured into methyl alcohol while stirring. After separating off and drying the precipitate formed the complex salt is obtained as a white powder, readily soluble in water with almost neutral reaction. The content of lead may be established by hydrogen sulfide, the content of calcium by oxalic acid in the customary manner.

*Example 9*

A solution of 85 grams of sodium pyrocatechol disulfonate in 150 ccs. of water is gradually mixed with 50 grams of freshly produced paste of antimonic acid (containing about 50% of antimonic acid) with frequent shaking and heating on the water bath. The solution obtained is neutralized with 2 n-milk of lime when cold, filtered and the complex salt formed is precipitated by the addition of methyl alcohol and ethyl alcohol. The antimony-V-calcium-pyrocatechol-sodium-disulfonate forms after separating and drying a whitish-grey powder readily soluble in water with a neutral reaction.

*Example 10*

Into a solution of 158 grams of sodium pyrogallol disulfonate in 200 ccs. of water 90 grams of freshly produced antimonic acid paste (about 50%) are introduced with frequent shaking and heating on the water bath. The solution obtained is neutralized with 2 n-milk of lime when cold, filtered and the complex salt formed is precipitated by the addition of methyl alcohol and ethyl alcohol. After separating and drying the precipitate the antimony-V-calcium-pyrogallol-sodium-disulfonate is obtained as a whitish-grey powder readily soluble in water with a neutral reaction.

*Example 11*

A solution of 33 grams of sodium pyrocatechol disulfonate and 11 grams of stannous chloride in water is gradually mixed while shaking with magnesium oxide until the solution displays a neutral or weakly alkaline reaction. After further shaking for a short time the undissolved parts are filtered off and the complex salt formed is precipitated by the addition of methyl alcohol. The precipitate is filtered with suction and washed with 90% alcohol until free from chlorine. After repeated reprecipitation from water-methyl-alcohol-ethyl-alcohol and drying in a desiccator the tin magnesium-pyrocatechol-sodium-disulfonate is obtained as a weakly colored powder readily soluble in water with an almost neutral reaction.

*Example 12*

33 grams of sodium pyrocatechol disulfonate are covered with 75 ccs. of water and 8.5 grams of crystallized copper chloride are added. Into this mixture an aqueous suspension of freshly precipitated strontium hydroxide is gradually introduced until a diluted test portion displays a neutral reaction. After filtering the solution is poured in methyl alcohol while stirring. The precipitate formed is fitered with suction and washed with 90% methyl alcohol. After drying the copper strontium pyrocatechol sodium disulfonate is obtained as a green powder soluble in water with almost neutral reaction on slight heating. On adding dilute caustic soda lye or hydrochloric acid the solution remains clear. By the addition of oxalic acid, strontium oxalate is precipitated.

*Example 13*

15 grams of potassium-2.3-dihydroxy naphthalene-6-sulfonate are covered with 35 ccs. of water. A solution of 4.5 grams of crystallized ferric chloride in 10 ccs. of water is added thereto. Into the mixture obtained 2 n-milk of lime is gradually introduced until a diluted test portion of the solution remains neutral after shaking for a short time. The solution is filtered, the filtrate concentrated and poured into alcohol while stirring. After separating off and drying the precipitate formed, the iron calcium dioxy naphthalene-potassium-sulfonate is obtained as a dark red powder readily soluble in water with almost neutral reaction.

*Example 14*

9 grams of pyrocatechol-orthocarboxylic acid are covered with 50 ccs. of water. A solution of 5.4 grams of crystallized ferric chloride in 10 ccs. of water is added thereto. Into this mixture 2 n-milk of lime is gradually introduced until a diluted test portion of the solution remains neutral after shaking for a short time. The solution is filtered and the filtrate poured into dry ethyl alcohol. After separating off and drying the precipitate formed the calcium salt of the iron calcium pyrocatechol-o-carboxylic acid is a dark violet powder readily soluble in water with almost neutral reaction.

*Example 15*

40 grams of the calcium sodium salt of calcium pyrocatechol disulfonic acid are boiled with 125 ccs. of water and 4 grams of zinc oxide until after a short time a solution is obtained. The solution is filtered and poured into methyl alcohol while stirring. After separating off and drying the precipitate formed the calcium sodium salt of zinc-calcium-pyrocatechol disulfonic acid is obtained as a white powder readily soluble in water with a neutral reaction.

*Example 16*

A solution of 40 grams of the calcium sodium salt of calcium pyrocatechol disulfonic acid in 125 ccs of water is mixed with 24 grams of cobaltous chloride and 5 n-caustic soda lye is added until a strongly diluted test portion of the solution displays a neutral reaction. The solution is filtered and poured into methyl alcohol while stirring.

After separating off and drying the precipitate formed the calcium sodium salt of the cobalt calcium pyrocatechol disulfonic acid is obtained as a bluish-red powder readily soluble in water with a neutral reaction.

A water soluble cobalt calcium complex compound is likewise obtained by dissolving 18 grams of calcium pyrocatechol disulfonate in 50 ccs of water, adding 12 grams of cobalt chloride and neutralizing with dilute caustic soda lye. The complex compound is separated as above described, it contains on one mol of pyrocatechol disulfonic acid about one gram atom of cobalt.

*Example 17*

A solution of 80 grams of the calcium sodium salt of calcium pyrocatechol disulfonic acid and 24 grams of copper chloride in 250 ccs. of water is gradually mixed with 5 n-caustic soda lye while stirring until a dilute test portion of the solution displays a neutral reaction. About 37 ccs of the 5 n-caustic soda lye are necessary. The solution obtained is filtered and poured into alcohol while stirring. The precipitate formed is filtered with suction washed with 90% alcohol until free from the mother liquor containing sodium chloride and dried in the air. The calcium sodium salt of copper-calcium-pyrocatechol-disulfonic acid is obtained as a green powder containing about 7% of copper and 7.5% of calcium, being soluble in water with a neutral reaction, to about 9%, the solution being isotonic to blood. On adding oxalic acid to the aqueous solution calcium oxalate is precipitated.

*Example 18*

Into a solution of 78 grams of calcium pyrocatechol-calcium-sodium-disulfonate in 150 ccs of water an aqueous suspension of bismuth hydroxide freshly produced from 31 grams of bismuth nitrate is introduced while shaking and heating on the water bath. After the bismuth hydroxide has dissolved, the solution is filtered and poured into methyl alcohol while stirring. After separating off and drying the precipitate formed the bismuth-calcium-pyrocatechol-calcium-sodium-disulfonate is obtained as a whitish powder, containing about 13% of bismuth and 8% of calcium, being readily soluble in water. On the addition of dilute hydrochloric acid or dilute caustic soda lye the solution remains clear. When adding oxalic acid calcium oxalate is precipitated, hydrogen sulfide precipitates bismuth sulfide.

*Example 19*

80 grams of calcium-pyrocatechol-calcium-sodium-disulfonate are heated with 120 ccs of water and mixed with a solution of 23 grams of antimony-trichloride in 30 ccs of methyl alcohol. 5 n-caustic soda lye is added until the solution displays a neutral reaction, the solution is filtered and the complex salt formed is precipitated by pouring the solution into methyl alcohol. After washing, advantageously with 90% methyl alcohol, and drying the antimony-calcium-pyrocatechol-calcium-sodium-disulfonate is obtained as a whitish powder readily soluble in water. The solution remains clear on the addition of dilute caustic soda lye or of dilute hydrochloric acid. Oxalic acid precipitates calcium oxalate, hydrogen sulfide after acidifying antimony-sulfide from the solution.

A similar product is obtained when starting directly with the reaction mixture which is formed when producing the calcium-pyrocatechol-calcium-sodium- disulfonate used as starting material above.

When neutralizing in the above described process instead of with caustic soda lye with milk of lime, a product displaying similar properties, containing about 13% of antimony and 7.5% of calcium is obtained. This complex compound yields a solution isotonic to blood at a concentration of about 12.5% which concentration is higher than the concentration of a solution isotonic to blood of the corresponding complex compounds containing only alkali metal as neutralizing bases.

*Example 20*

A solution of 18 grams of pyrocatechol-calcium-disulfonate in a small quantity of water is neutralized by freshly precipitated strontium hydroxide. After standing for some time the solution is filtered and the complex compound formed precipitated from the filtrate by means of alcohol. After separating off and drying the precipitate the strontium-pyrocatechol-calcium disulfonate is obtained as a whitish powder which is readily soluble in water with neutral reaction. The aqueous solution remains clear on the addition of dilute hydrochloric acid or dilute caustic soda lye. In the complex compound strontium may be established, for example, by the red coloration of the flame.

*Example 21*

A solution of 40 grams of calcium-pyrocatechol-calcium-sodium-disulfonate in 100 ccs of water is mixed with an aqueous solution of 20 grams of thorium chloride and the mixture neutralized by means of dilute caustic soda lye. The solution is filtered and the complex salt formed precipitated from the filtrate by means of alcohol. After separating off and drying the precipitate, the thorium-calcium-pyrocatechol-calcium-sodium-disulfonate is obtained as a pale colored powder being readily soluble in water with neutral reaction.

Example 22

A solution of 186 grams of pyrocatechol-sodium-disulfonate in 400 ccs of water is gradually mixed while heating with a suspension of bismuth hydroxide, freshly produced from 146 grams of bismuth nitrate, in such quantities as are dissolved in the reaction mixture. The solution is concentrated to about 350 ccs, neutralized with 2 n-milk of lime and the complex compound formed precipitated by pouring the solution into methyl alcohol. After separating off and drying the precipitate the bismuth-calcium-pyrocatechol-sodium-disulfonate is obtained as a pale colored powder, containing about 21% of bismuth and about 2% of calcium and being readily soluble in water with neutral reaction, the 10% solution being isotonic to blood. The solution remains clear on the addition of dilute hydrochloric acid or dilute caustic soda lye, hydrogen sulfide precipitates bismuth sulfide.

I claim:—

1. As new products neutral complex compounds of a metal, having an atomic number higher than 21, with an aromatic polyhydroxy compound of the group consisting of benzene and naphthalene derivatives containing at least two hydroxy groups in ortho-position to each other and at least one acid, salt-forming group, which metal complex compounds contain an alkaline-earth metal of the group consisting of calcium, magnesium and strontium, the complete neutrality of the complex compounds being effected by the content of a metal of the group consisting of calcium, magnesium, strontium and alkali metals, said complex compounds being white or colored powders, soluble in water with neutral reaction.

2. As new products neutral complex compounds of a heavy metal of the group consisting of antimony, bismuth, copper, lead, tin, iron, zinc, cobalt and thorium with an aromatic polyhydroxy compound of the group consisting of benzene and naphthalene derivatives containing at least two hydroxy groups in ortho-position to each other and at least one acid, salt-forming group, which metal complex compounds contain an alkaline-earth metal of the group consisting of calcium, magnesium and strontium, the complete neutrality of the complex compounds being effected by the content of a metal of the group consisting of calcium, magnesium, strontium and alkali metals, said complex compound being white or colored powders, soluble in water with neutral reaction.

3. As new products neutral complex compounds of a metal, having an atomic number higher than 21, with a benzene compound containing at least two hydroxy groups in ortho-position to each other and at least one acid, salt-forming group, which metal complex compounds contain an alkaline-earth metal of the group consisting of calcium, magnesium and strontium, the complete neutrality of the complex compounds being effected by the content of a metal of the group consisting of calcium, magnesium, strontium and alkali metals, said complex compounds being white or colored powders, soluble in water with neutral reaction.

4. As new products neutral complex compounds of a heavy metal of the group consisting of antimony, bismuth, copper, lead, tin, iron, zinc, cobalt and thorium with a benzene compound containing at least two hydroxy groups in ortho-position to each other and at least one acid, salt-forming group, which metal complex compounds contain an alkaline-earth metal of the group consisting of calcium, magnesium and strontium, the complete neutrality of the complex compounds being effected by the content of a metal of the group consisting of calcium, magnesium, strontium and alkali metals, said complex componds being white or colored powders, soluble in water with neutral reaction.

5. As new products neutral complex compounds of a metal, having an atomic number higher than 21, with pyrocatechol disulfonic acid, which metal complex compounds contain an alkaline-earth metal of the group consisting of calcium, magnesium and strontium, the complete neutrality of the complex compounds being effected by the content of a metal of the group consisting of calcium, magnesium, strontium and alkali metals, said complex compounds being white or colored powders, soluble in water with neutral reaction.

6. As new products neutral complex compounds of a heavy metal of the group consisting of antimony, bismuth, copper, lead, tin, iron, zinc, cobalt and thorium with pyrocatechol disulfonic acid, which metal complex compounds contain an alkaline-earth metal of the group consisting of calcium, magnesium and strontium, the complete neutrality of the complex compounds being effected by the content of a metal of the group consisting of calcium, magnesium, strontium and alkali metals, said complex compounds being white or colored powders, soluble in water with neutral reaction.

7. As new products neutral complex compounds of a heavy metal of the group consisting of antimony, bismuth and copper with an aromatic polyhydroxy compound of the group consisting of benzene and naphthalene derivatives containing at least two hydroxy groups in ortho-position to each other and containing at least one acid, salt-forming group, which complex compounds contain calcium, the complete neutrality of the complex compounds being effected by the content of a metal of the group consisting of calcium, magnesium, strontium and alkali metals, said complex compounds being white or colored powders, soluble in water with neutral reaction.

8. As new products neutral complex compounds of a heavy metal of the group consisting of antimony, bismuth and copper with a benzene sulfonic acid containing at least two hydroxy groups in ortho-position to each other, which complex compounds contain calcium, the complete neutrality of the complex compounds being effected by the content of a metal of the group consisting of calcium, magnesium, strontium and alkali metals, said complex compounds being white or colored powders, soluble in water with neutral reaction.

9. As new products neutral complex compounds of a heavy metal of the group consisting of antimony, bismuth and copper with pyrocatechol disulfonic acid, which complex compounds contain calcium, the complete neutrality of the complex compounds being effected by the content of a metal of the group consisting of calcium, magesium, strontium and alkali metals, said complex compounds being white or colored powders, soluble in water with neutral reaction.

10. As new products complex compounds of trivalent antimony with pyrocatechol disulfonic acid, containing calcium and sodium as neutralizing bases, said complex compounds being whitish powders, soluble in water with neutral reaction.

11. As a new product the antimony-III-calcium-pyrocatechol-calcium-sodium-disulfonate, being a whitish powder containing about 13% of antimony and about 7.5% of calcium, yielding with water a neutral solution which is isotonic to blood at a concentration of about 12.5%.

12. As new products complex compounds of bismuth with pyrocatechol disulfonic acid, containing calcium and sodium as neutralizing bases, said complex compounds being pale colored powders, soluble in water with neutral reaction.

13. As a new product the bismuth-calcium-pyrocatechol-sodium-disulfonate, being a pale colored powder, containing about 21% of bismuth and about 2% of calcium, yielding with water a neutral solution which is isotonic to blood at a concentration of about 10%.

14. As new products complex compounds of copper with pyrocatechol disulfonic acid, containing calcium and sodium as neutralizing bases, said complex compounds being green powders, soluble in water with neutral reaction.

15. As a new product the copper-pyrocatechol-calcium-sodium-disulfonate, being a green powder, containing about 7% of copper and 7.5% of calcium, yielding with water a neutral solution which is isotonic to blood at a concentration of about 9%.

16. The process which comprises reacting upon an aromatic polyhydroxy compound of the group consisting of benzene and naphthalene derivatives containing at least two hydroxy groups in ortho-position to each other and at least one acid, salt-forming group, with a metallic oxygen compound of the group consisting of oxides and hydroxides of a metal, having an atomic number higher than 21, and an alkaline-earth metal hydroxide of the group consisting of calcium-, strontium- and magnesium-hydroxide, in aqueous solution and neutralizing the reaction mixture with a base of the group consisting of calcium-, strontium-, magnesium- and alkali metal hydroxides.

17. The process which comprises reacting upon an aromatic polyhydroxy compound of the group consisting of benzene and naphthalene derivatives containing at least two hydroxy groups in ortho-position to each other and at least one acid, salt-forming group, with a metallic oxygen compound of the group consisting of oxides and hydroxides of a heavy metal of the group consisting of antimony, bismuth, copper, lead, tin, iron, zinc, cobalt and thorium, and an alkaline earth metal hydroxide of the group consisting of calcium-, strontium- and magnesium-hydroxide, in aqueous solution and neutralizing the reaction mixture with a base of the group consisting of calcium-, strontium-, magnesium- and alkali metal-hydroxides.

18. The process which comprises reacting upon a benzene compound containing at least two hydroxy groups in ortho-position to each other and at least one acid, salt-forming group, with a metallic oxygen compound of the group consisting of oxides and hydroxides of a heavy metal of the group consisting of antimony, bismuth, copper, lead, tin, iron, zinc, cobalt and thorium, and an alkaline earth metal hydroxide of the group consisting of calcium-, strontium- and magnesium-hydroxide, in aqueous solution and neutralizing the reaction mixture with a base of the group consisting of calcium-, strontium-, magnesium- and alkali metal-hydroxides.

19. The process which comprises reacting upon a benzene sulfonic acid containing at least two hydroxy groups in ortho-position to each other, with a metallic oxygen compound of the group consisting of oxides and hydroxides of a heavy metal of the group consisting of antimony, bismuth, copper, lead, tin, iron, zinc, cobalt and thorium, and an alkaline-earth metal hydroxide of the group consisting of calcium-, strontium- and magnesium-hydroxide, in aqueous solution and neutralizing the reaction mixture with a base of the group consisting of calcium-, strontium-, magnesium- and alkali metal-hydroxides.

20. The process which comprises reacting upon pyrocatechol disulfonic-acid with a metallic oxygen compound of the group consisting of oxides and hydroxides of a heavy metal of the group consisting of antimony, bismuth and copper, and calcium-hydroxide in aqueous solution and neutralizing the reaction mixture with a base of the group consisting of calcium- and sodium-hydroxides.

In testimony whereof, I affix my signature.

HANS SCHMIDT.

Certificate of Correction

Patent No. 1,889,383. November 29, 1932.

HANS SCHMIDT

It is hereby certified that error appears in the printed specification of the above-numbered patent requiring correction as follows: Page 2, strike out the formula between lines 61 to 65, and insert instead—

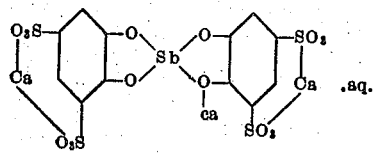

same page, strike out the formula between lines 68 to 73, and insert instead—

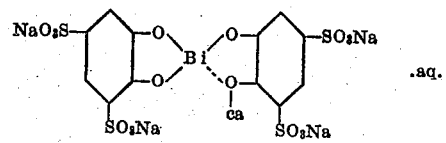

and that the said Letters Patent should be read with these corrections therein that the same may conform to the record of the case in the Patent Office.

Signed and sealed this 21st day of February, A. D. 1933.

[SEAL.]

M. J. MOORE,
*Acting Commissioner of Patents.*